Figure 1:
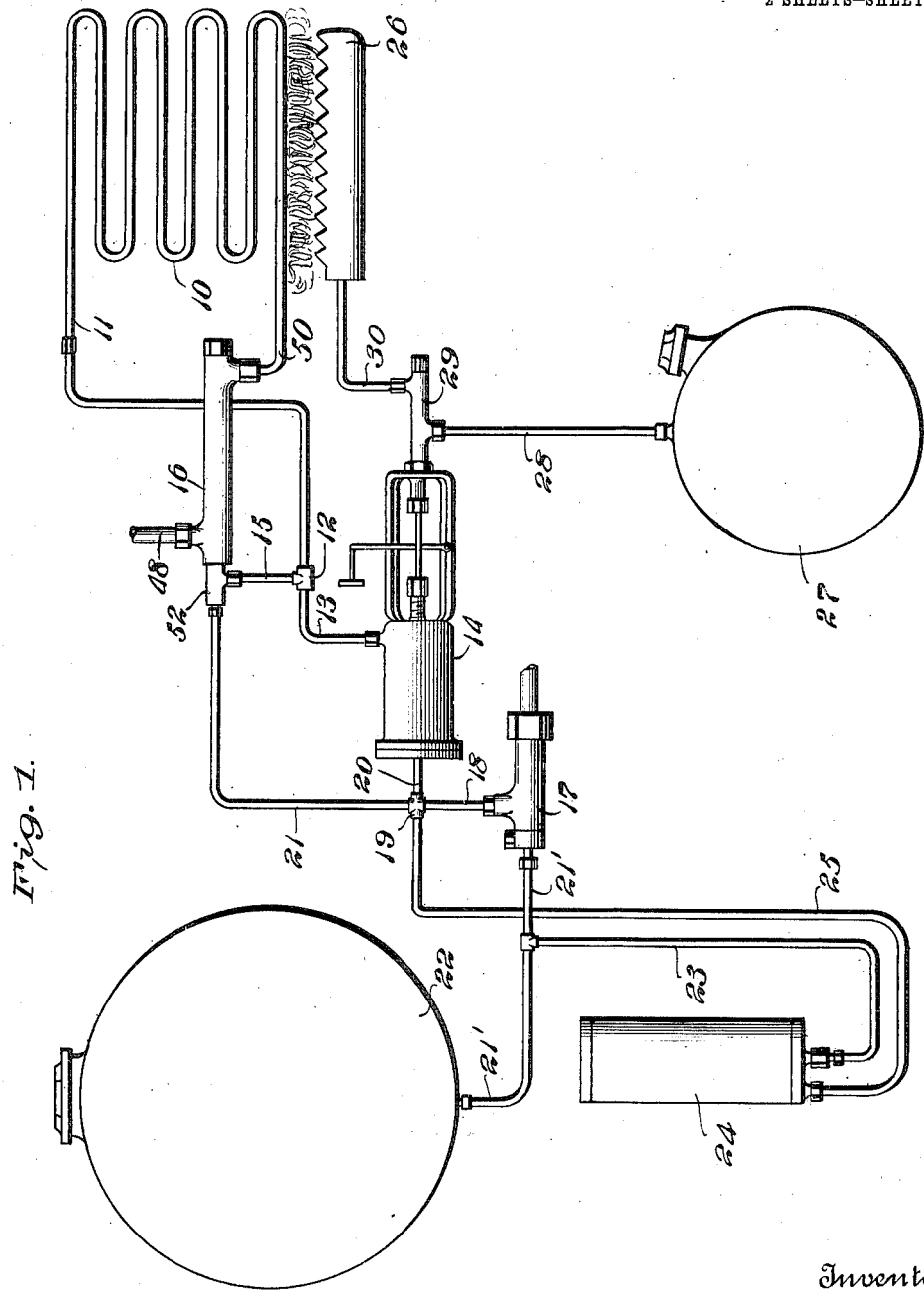

A. DOBLE.
REGULATOR FOR FLASH BOILERS.
APPLICATION FILED AUG. 10, 1911.

1,030,983.

Patented July 2, 1912.
2 SHEETS—SHEET 1.

Witnesses
Adolph Bishop
B. M. Kent

Inventor
Abner Doble
by Foster Freeman Watson & Coit
Attorneys

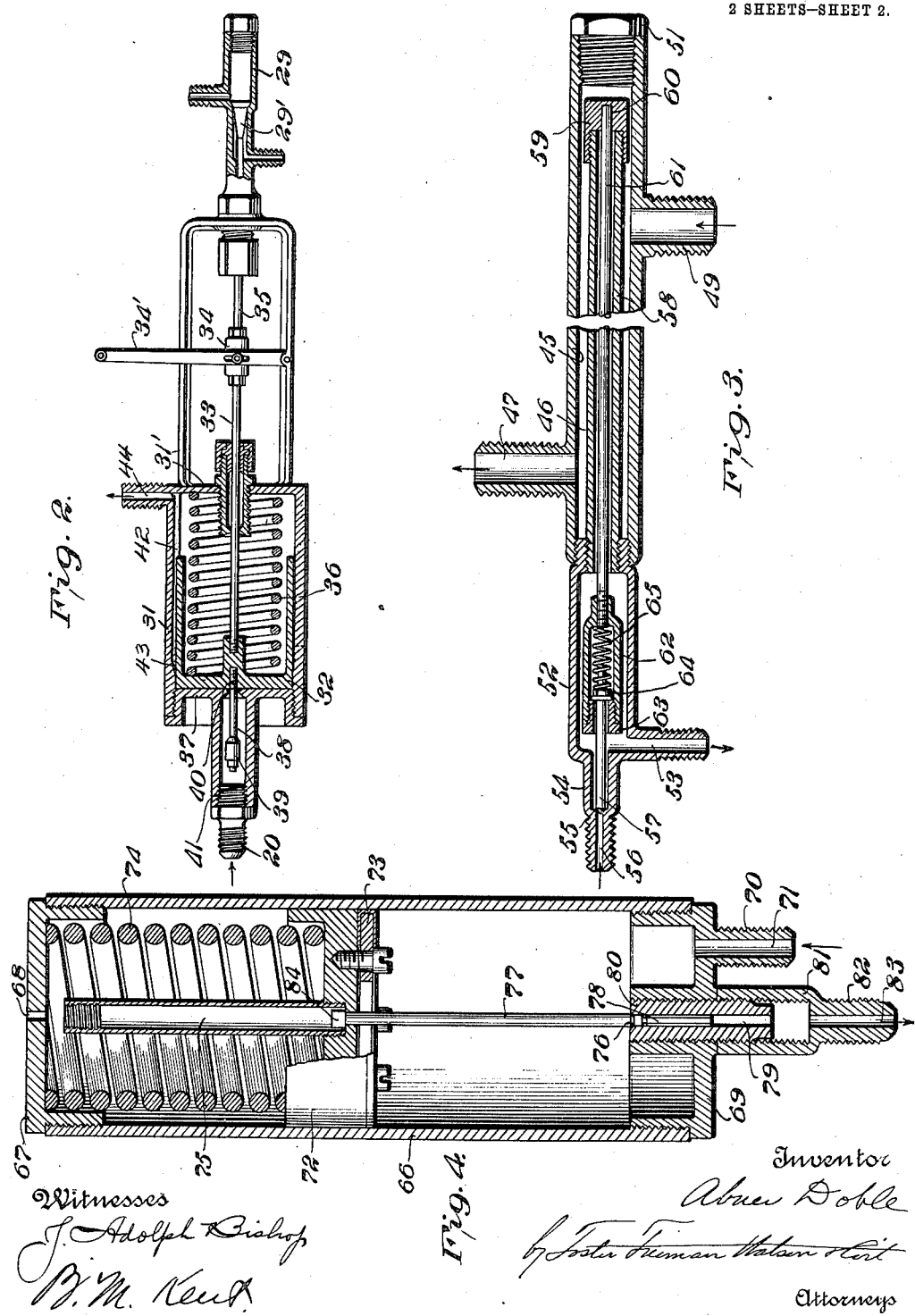

UNITED STATES PATENT OFFICE.

ABNER DOBLE, OF BROOKLINE, MASSACHUSETTS, ASSIGNOR TO HELEN A. DOBLE, OF BROOKLINE, MASSACHUSETTS.

REGULATOR FOR FLASH-BOILERS.

1,030,983.  Specification of Letters Patent.  Patented July 2, 1912.

Application filed August 10, 1911. Serial No. 643,420.

*To all whom it may concern:*

Be it known that I, ABNER DOBLE, a citizen of the United States, and resident of Brookline, Norfolk county, State of Massachusetts, have invented certain new and useful Improvements in Regulators for Flash-Boilers, of which the following is a specification.

This invention relates to steam generators of the flash type and more particularly to mechanism for supplying and regulating the fuel and water to such generators and is especially for use in connection with steam motor vehicles.

One of the objects of the invention is to provide a system capable of permitting the full generating capacity of the boiler to be utilized regardless of the speed of the vehicle.

Another object is to provide a system in which the amount of water supplied to the boiler is in proportion to the amount of steam being used by the engine.

A further object is to provide a system in which the fuel supplied to the boiler is always in proportion to the amount of heat required.

Other objects and the features of novelty of the invention will be apparent from the following description taken in connection with the accompanying drawings, in which, Figure 1 is a diagrammatic view showing the arrangement of my system; Fig. 2 is a longitudinal section of the flow motor; Fig. 3 is a longitudinal section of the thermostat; Fig. 4 is a longitudinal section of the pressure regulator.

Referring to Fig. 1, the generator which may be of any suitable type, is indicated by the numeral 10. The inlet pipe 11 of the generator communicates with a T 12 from which extends a branch 13 leading to a flow-motor 14 and a branch 15 leading to a thermostat 16. The thermostat and the flow-motor are supplied with water from a pump 17 which has a discharge pipe 18 leading to a cross 19 which connects with the pipe 20 leading to the flow-motor and with the pipe 21 leading to the thermostat. The pump 17 is driven from the engine and has an inlet pipe 21' leading from a water supply tank 22. Communicating with the pipe 21' is a pipe 23 leading from the pressure regulator and accumulator 24. The inlet pipe for this pressure regulator is indicated by the numeral 25 and connects with the cross 19. A burner 26 for the generator receives fuel from the fuel tank 27, by means of a pipe 28 which connects with the fuel supply valve 29 and a pipe 30 leading from the valve 29 to the burner.

Referring now to Fig. 2 which shows a longitudinal section of the flow-motor, it will be seen that this consists of a cylinder 31 within which is a piston 32. The piston 32 has secured thereto a stem 33 which is connected by means of a coupling 34 with the stem 35 of the fuel supply valve 29. A spring 36 is located within the piston 32 and presses against the head 31' of the cylinder 31 and the head of the piston and tends to move the piston toward the head 37 of the cylinder. The piston 32 also has secured thereto a stem 38 carrying a valve 39 adapted to engage a seat 40 when the piston has moved to the extreme right hand position. The cylinder head 37 has a chambered extension 41 within which moves the valve 39 and communicating with the chamber in this extension is the pipe 20 from the pump 17. An annular passage is provided around the valve stem 38 for admitting water from the chamber within the extension 41 to the interior of the cylinder 31. At one side of the piston and in the wall of the cylinder is formed a groove 42 which has a tapering portion 43. This groove communicates with a port 44 to which is connected the pipe 13. It will also be noticed that the port 42 communicates with the interior of the cylinder 31 at the left hand side of the piston 32.

The operation of the flow-motor is as follows: Water from the pump 17 enters the flow-motor through the pipe 20 and past the valve seat 40, the pressure of the water acting on the left hand side of the piston 32. The pressure in the generator acts on the opposite side of the piston in opposition to the pump pressure and is aided by the tension of the spring 36. When the pressure in the generator equals the pump pressure the piston 32 will stand in the position shown in Fig. 2, and when the pressure in the generator falls below the pump pressure it will be seen that the piston 32 will be moved toward the right until the passage 43 is uncovered and water will then flow through this passage and out through the passage 44 to the generator. The greater the difference in pressure between the generator and the pump, the farther the piston 32 will be moved toward the right and on account of the passage 42 being tapered, it will be seen that the flow of water to the generator will be varied in accordance with this difference in pressure. The tension of the spring 36 is so adjusted that the piston 32 will be moved toward the right an amount sufficient to close the valve 39 on the seat 40 when the quantity of water flowing reaches the maximum evaporating capacity of the generator. The closing of the valve 39 serves as a positive means for preventing the generator from being "flooded".

On account of the fuel valve 29 being connected with the piston 32, it will be seen that as the flow of water to the generator varies, the quantity of fuel supplied to the burner will be also varied, and the fuel valve being provided with a tapering portion 29' is adapted to supply fuel to the burner at a rate always relatively in excess of the rate of flow of water to the generator. A hand lever 34' is pivoted at one end and connected with the stem 33 for the purpose of providing a means to manually control the flow of water and fuel to the generator.

Referring to Fig. 3 in which a longitudinal section of the thermostat is shown, it will be seen that this thermostat comprises a casing 45 having a longitudinally extending chamber 46, one side of which communicates with the passage 47 connected with a pipe 48 for supplying steam to the engine. At the opposite end of the chamber 46 is a passage 49 which communicates with the pipe 50 leading from the boiler. The casing 45 is closed at one end by a plug 51 and the opposite end thereof is interiorly threaded and has secured thereto a chambered body 52. The interior of this chambered body has a passage 53 communicating therewith at one end and this passage is in communication with the pipe 15. Another passage 54 is axially arranged in the body 52 and provided with a valve seat 55 for closing the passage 56 which connects with the pipe 21. A valve 57 is adapted to engage the valve seat 55 and has a stem extending into the chamber within the body 52, said stem being of smaller diameter than the passage 54, whereby means for communication between the passage 56 and the interior of the body 52 is provided. Within the chamber 46 is a tube 58, preferably made of copper, which is secured to the body 52 and has its outer end closed by a cap 59. Within the tube 58 and having one end bearing in a recess 60 in cap 59 is a rod 61 preferably made of steel. This rod extends into the chamber within the body 52 and has secured thereto one end of the cup-shaped member 62. The opposite end of this member 62 is provided with a plug 63 through which freely passes the stem of the valve 57, said stem having secured on its end within the cup-shaped member 62 a cap 64, and pressing against said cap and the end of the cup-shaped member 62 is a spring 65.

The operation of the thermostat is as follows: Steam from the boiler entering the chamber 46 by way of the passage 49 passes longitudinally of said chamber and leaves the same through passage 47. The steam in passing through the chamber 46 heats the tube 58 and the rod 61 to its own temperature, thereby causing them to expand. On account of the relatively larger coefficient of expansion of the copper tube, this tube will expand to a greater extent than the steel rod and thereby allow the valve 57 to move from the seat 55 and permit water to flow through the passages 56 and 53 to the boiler. The thermostat is so adjusted that the valve 57 only opens when the steam passing through the chamber 46 reaches a predetermined temperature. The spring 65 holds the valve 57 on its seat against the pressure in the passage 56.

Referring to Fig. 4 which is a longitudinal section of the pump pressure regulator and accumulator, it will be seen that this comprises a cylindrical casing 66 provided, at one end with a cover 67 having a vent 68. The opposite end of the casing is provided with a cover 69 having an extension 70 through which is a passage 71 for establishing communication between the interior of the casing and the pipe 25. A piston 72 is arranged within the casing and provided with packing means 73. A spring 74 is arranged in a casing and presses against the cover 67 and the piston 72 and is adapted to act in opposition to the pressure from the pump on the opposite side of the piston. An axially extending tube 75 is connected with the piston and arranged within the spring 74. The valve 76 is arranged on a stem 77 which has a projection 78 below the valve and extending into a passage 79 in an adjustable plug 80 having threaded engagement with the cover 69. A seat is formed in the upper end of the plug 80 for the valve 76. The plug 80 projects below the cover 69 and a nut 81 has threaded engagement therewith and serves to lock the plug 80 in any desired position in the cover 69. The nut 81 has an exteriorly threaded extension 82 provided with a passage 83. The pipe 23 is connected with the extension 82 and by means of the passages 79 and 83 communication between the interior of the casing 66 below the piston 72, and the pipe 23, is established when the valve 76 is open. The upper end of the stem 77 is adapted to freely slide through piston 72 and is provided with a head 84 which moves within the tube 75 and is adapted to be engaged on its under side by the piston 72.

The operation of the pressure regulator and accumulator is as follows: The pump pressure is communicated to the lower side of the piston 72 by means of the pipe 25 and the passage 71 and compresses the spring 74 until it just balances the pressure on the piston. The mechanism is so adjusted that it will assume the position shown in Fig. 4 for the predetermined working pressure of the pump which it is desired to maintain uniform. It will be noted that in the position shown the head 84 of the rod 77 is in engagement with the piston and that any increase in pressure would tend to raise the piston and draw the valve 76 away from its seat in the plug 80, thereby permitting water to flow out from the chamber below the piston 72 through the passages 79 and 83 into the pipe 23 which communicates with the suction pipe 21' or may discharge into the water tank 22. It will therefore be evident that this regulator prevents the water pressure from ever exceeding a certain desired amount.

The operation of the system as a whole will now be described.

The pump 17 will usually be driven by the engine of the vehicle and at a speed in proportion to the speed of the vehicle. The capacity of the pump is such that it will deliver under all conditions a larger quantity of water than can be used by the engine when taking steam for the full stroke. The excess of water over that delivered to the generator will be by-passed by means of the regulator 24 to the suction side of the pump and the delivery pressure of the pump maintained at all times at a uniform pressure which will usually be the maximum working pressure of the generator, say 750 pounds per square inch. As has been hereinbefore described, water will pass through the flow-motor from the pipe 20 to the pipe 13, which supplies the generator, in proportion to the difference in pressure between the generator and the pump pressure. On account of the quantity of fuel supplied to the burner being in excess of the amount required to vaporize the water flowing to the generator, circumstances will arise which will cause the steam from the generator to be superheated to an excessive degree and under such conditions the thermostat 16 will come into operation and admit water from the pump to the pipe 15 which communicates with the inlet pipe 11 of the generator, whereby a quantity of water in addition to that supplied by the flow-motor will be delivered to the generator and reduce the temperature of the steam. Whenever an excessive draft of steam causes an abnormal drop in pressure in the generator, the flow-motor piston will be moved by the pump pressure to its maximum right hand position and close the valve 39, thereby preventing an excessive amount of water from flowing to the generator and flooding the same and as a consequence still further reducing the pressure. When the valve 39 is closed it will be understood that the flow of water through the flow-motor to the generator is positively interrupted and at the same time the fuel valve is supplying a maximum quantity of fuel to the burner. Under these conditions, with practically no water going to the generator and with a maximum supply of fuel, it will be seen that there will be a rapid rise in pressure and the steam will be excessively superheated. This excessive superheating of the steam will cause the thermostatic valve to open and admit water to the generator thereby supplying the deficiency due to the interruption of the supply through the flow-motor. The pressure in the generator being thus restored to normal the flow-motor piston moves toward the left and opens the valve 39, thereby admitting an additional supply of water to the generator and the temperature of the steam will be reduced and the thermostatic valve closed and normal conditions be restored. This system of regulation provides for the utilization of the maximum vaporizing capacity of the generator under all conditions, regardless of the speed of the car as the capacity of the pump is such as to deliver at all times more water than will be required by the engine. By maintaining the delivery pressure of the pump uniform and by normally regulating the supply of water to the generator and the fuel to the burner by the drop in pressure in the generator from the pump pressure, it will be seen that I have provided a system in which the fuel and water supplied to the generator will be under all conditions of running substantially in proportion to the quantity of steam utilized in the engine, as the rate of flow of steam will determine the drop in pressure.

Having described my invention what I claim and desire to secure by Letters-Patent is, 1. In an apparatus of the class described, the combination of a steam generator, means for supplying fuel to the generator, means including an accumulator and a pump for maintaining a supply of water at a uniform pressure, means for normally delivering water through a restricted opening to the generator, and means for varying the size of said opening in accordance with the variations in pressure of the steam generated therein, means for by-passing water around said opening to the generator when the temperature of the steam leaving the generator exceeds a predetermined degree, and means for supplying fuel to the generator in accordance with the variations in pressure in the generator.

2. In an apparatus of the class described, the combination of a steam generator, means for supplying fuel to the generator, means including an accumulator and a pump for maintaining a supply of water at a uniform pressure, means for normally delivering water to the generator in accordance with the drop in pressure in the generator from the water supply pressure, means for interrupting the supply of water to the generator when said drop in pressure exceeds a predetermined amount, and means for maintaining a constant supply of fuel to the generator in accordance with said drop in pressure.

3. In an apparatus of the class described, the combination of a steam generator, means for supplying fuel to the generator, means including an accumulator and a pump for maintaining a supply of water at a uniform pressure, means for normally delivering water to the generator in accordance with the drop therein from the water supply pressure, additional means for supplying water to the generator in accordance with the excess of temperature of the steam above a predetermined degree, means for interrupting the supply of water to the generator when said drop in pressure exceeds a predetermined amount, and means for maintaining a supply of fuel to the generator in accordance with said drop in pressure.

4. In an apparatus of the class described, the combination of a steam generator, a burner therefor, a fuel supply, means for conveying the fuel to said burner and provided with a regulating valve, a water supply, a pump receiving water from said water supply and arranged to deliver water at a rate always in excess of the requirements of the engine, a pressure regulator adapted to maintain the delivery pressure from said pump uniform, a flow-motor receiving water from said pump and adapted to deliver water to the generator in accordance with the drop in pressure in the generator from the delivery pressure of said pump, and a valve actuated by the flow-motor and adapted to interrupt the flow of water thereto when the rate of flow exceeds a predetermined amount.

5. In an apparatus of the class described, the combination of a steam generator, a burner therefor, a fuel supply, means for conveying fuel to said burner and provided with a regulating valve, a water supply, a pump receiving water from said water supply and arranged to deliver water at a rate always in excess of the requirements of the engine, a pressure regulator adapted to maintain the delivery pressure from said pump uniform, a flow-motor receiving water from said pump and adapted to deliver water to the generator at a rate corresponding to the drop in pressure in the generator from the delivery pressure of said pump, a thermostatic valve controlled by the temperature of the steam leaving the generator and adapted to admit water from said pump to the generator when a certain predetermined steam temperature is exceeded, a valve actuated by the flow-motor and adapted to interrupt the flow of water thereto when the rate of flow exceeds a predetermined amount, and means connecting said flow-motor with said fuel regulating valve whereby the fuel supplied to the burner is controlled by the flow-motor.

6. An apparatus of the class described, comprising a steam generator, means including a pump, an accumulator, and a flow motor for supplying water to the generator, said flow-motor comprising a cylinder, a piston in said cylinder, a conduit connecting said cylinder on one side of said piston with a water supply, a valve in said conduit and connected with said piston, means for conveying water from said cylinder to the generator and adapted to be controlled by the piston, said piston being moved by the differences in pressure between the generator and the water supply, and said valve being adapted to interrupt the flow of water to said cylinder when the rate of flow exceeds a predetermined amount.

7. An apparatus of the class described comprising a steam generator, means including a pump and an accumulator for supplying water at a uniform pressure, and a flow-motor, said flow-motor comprising a cylinder, a piston in said cylinder, a conduit connected with one end of said cylinder and with said water supply, whereby said supply pressure acts on one side of said piston, a valve in said conduit and connected with said piston, means for conveying water to the generator and leading from the other end of said cylinder whereby the pressure in the generator acts on the other side of said piston, a spring in said cylinder and acting with the generator pressure on said piston, and means in said cylinder controlled by said piston and adapted to vary the flow of water to the generator in accordance with the movements of the piston, and said valve being adapted to interrupt the flow of water to said cylinder when the rate of flow exceeds a predetermined amount.

8. An apparatus of the class described comprising a steam generator, means for supplying water and fuel to the generator, a valve in the fuel supply means, a flow-motor for controlling said valve and the supply of water to the generator and comprising a cylinder provided with a piston, means for maintaining a supply of water at a uniform pressure, a conduit for conveying water from said supply to one end of said cylinder, a valve in said conduit actuated by said piston, means for conveying water from the other end of said cylinder to the generator, a passage in the cylinder controlled by the piston and adapted to vary the flow of water to the generator, and the valve in said supply conduit being adapted to close when the rate of flow of water to the generator exceeds a predetermined amount, and said fuel valve being arranged to permit a maximum flow of fuel when said water supply valve is closed.

In testimony whereof I affix my signature in presence of two witnesses.

ABNER DOBLE.

Witnesses:
EDWARD A. McETTRICK,
MARGARET O'HEARN.